Oct. 9, 1962   A. R. ALLAN, JR   3,057,468
PACKAGE FOR FILTERS
Filed April 5, 1960   2 Sheets-Sheet 1

INVENTOR.
ADRIAN R. ALLAN, Jr.
BY Kane, Dalsimer & Kane

ATTORNEYS

Oct. 9, 1962     A. R. ALLAN, JR     3,057,468
PACKAGE FOR FILTERS
Filed April 5, 1960     2 Sheets-Sheet 2
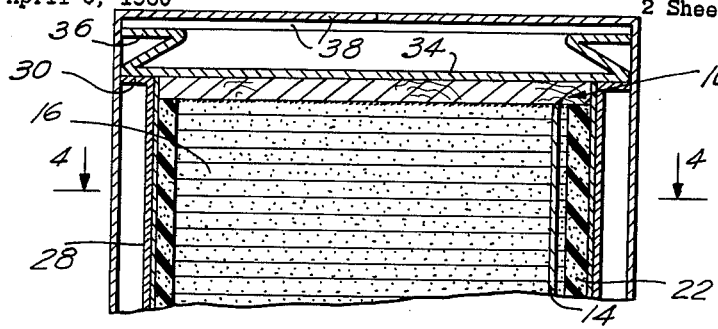
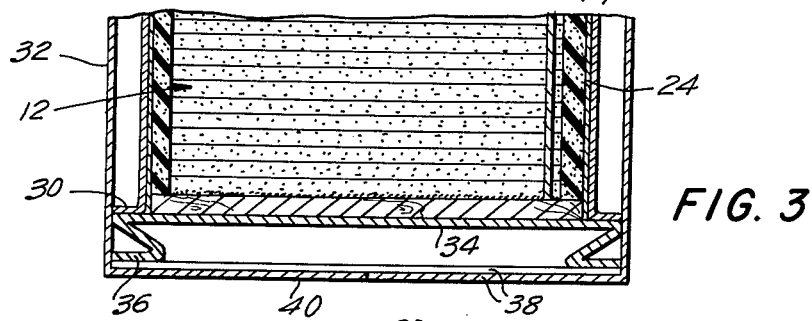
FIG. 3
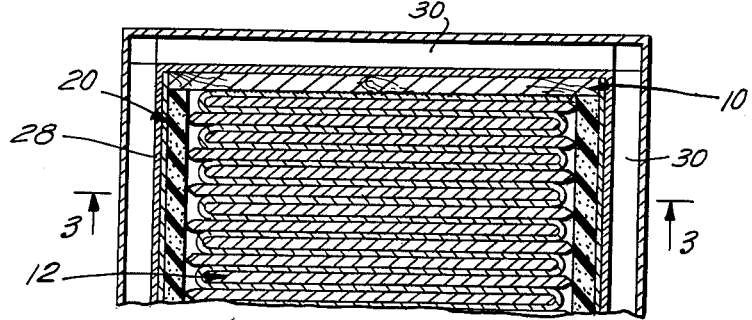
FIG. 4
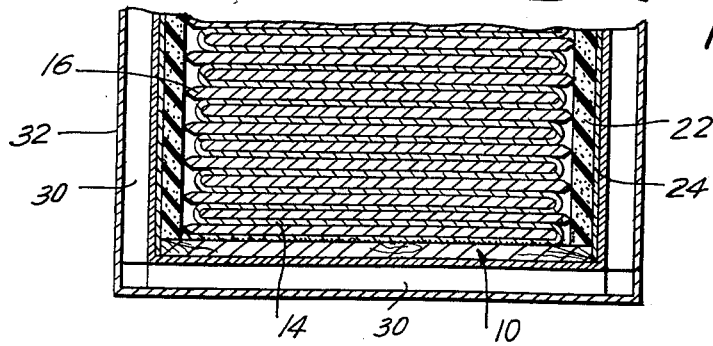
INVENTOR.
ADRIAN R. ALLAN, Jr.
BY Kane, Dalsimer & Kane
ATTORNEYS

United States Patent Office 3,057,468
Patented Oct. 9, 1962

3,057,468
PACKAGE FOR FILTERS
Adrian R. Allan, Jr., Westhampton Beach, N.Y., assignor to Flanders Filters, Inc., Riverhead, N.Y., a corporation of New York
Filed Apr. 5, 1960, Ser. No. 20,144
3 Claims. (Cl. 206—46)

This invention relates to an improved package for filters, and more particularly to a package for filters of the type consisting of a filter pack mounted in a relatively rigid frame.

A problem exists in the packaging and shipping of relatively large particulate filters of the type used in removing particles from fluids such as air. Filters of this type generally consist of a relatively rigid supporting frame having a filter pack mounted therein and having sealing engagement with the frame. Such filters are frequently mounted in the air stream in a vent, duct, stack or circulating system, used in connection with chemical or physical processes, heating, cooling or air conditioning systems, furnaces, gas cooled reactors or the like. The filter is mounted in the duct or stack so that all of the gas or air must pass therethrough. It is important that the filter pack have sealing engagement with the frame of the filter assembly in order to prevent by-passing of the filter. Unfortunately, however, in shipping and handling the filter prior to installation, it is frequently subjected to impacts, jars and shocks which cause a separation of at least a portion of the periphery of the filter pack from the frame with the result that by-passing will occur. This is particularly undesirable where the gases contain contaminants which are dangerous to human health and life, as in the case of gases from nuclear reactors.

It is an object of the present invention to overcome the difficulties heretofore encountered and to provide an improved package for filters which will prevent or minimize damage to the filters in shipment and which will particularly prevent separation or breaking of the seal between the filter pack and the filter frame when the filter is subjected to impacts, jars or shocks during handling and shipment prior to installation.

A further object is the provision of an improved package for filters which is of relatively simple construction and which can be readily applied to the filter prior to shipment and handling and removed therefrom at the time of installation.

In the accompanying drawings:

FIG. 3 is a longitudinal sectional view of the packaged filter taken through the center of the filter between the upstream to the downstream faces thereof; and FIG. 4 is a sectional view in the direction of the arrows on the line 4—4 of FIG. 3.

Figures 1, 2:
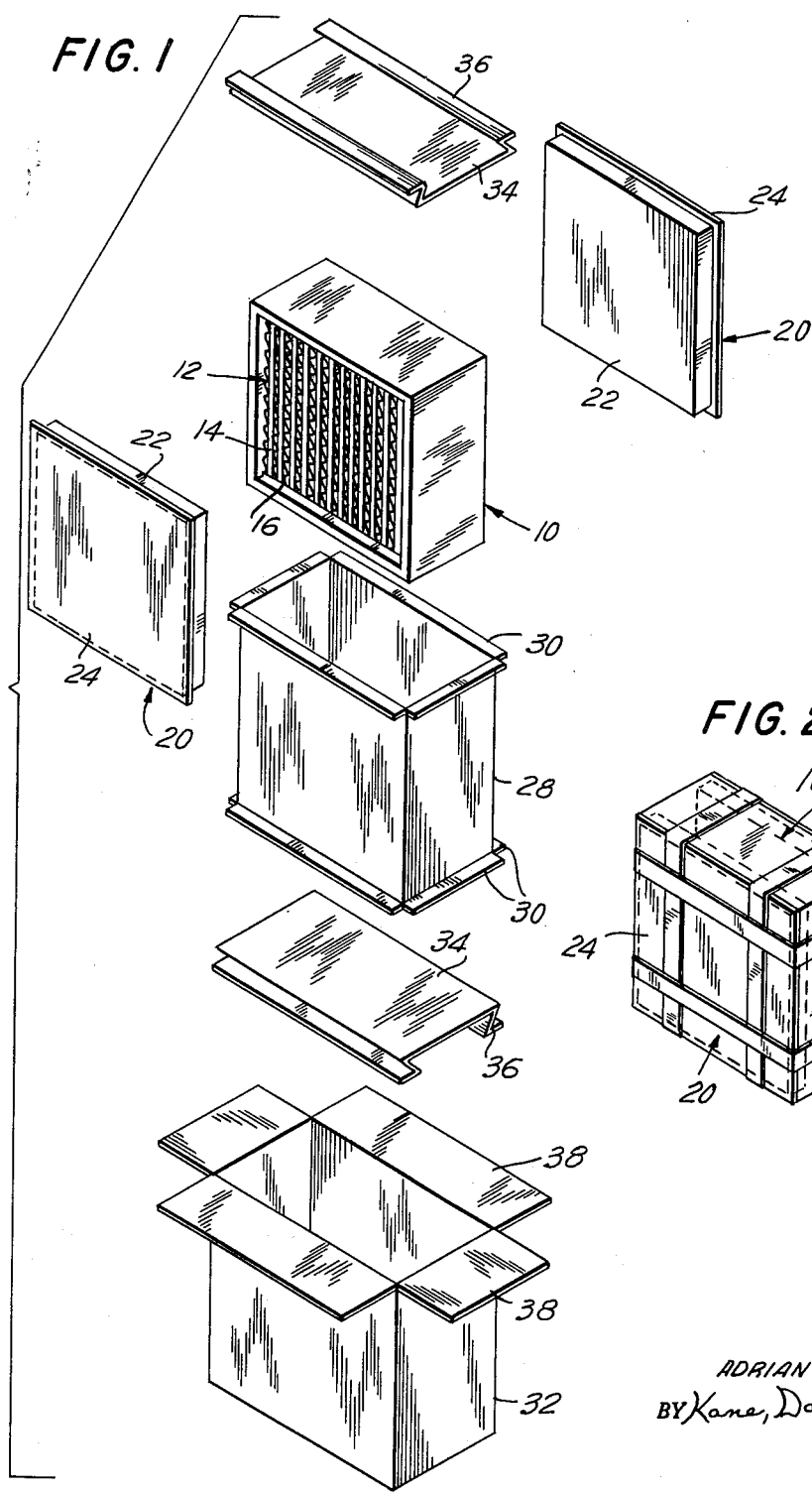
FIG. 1 is an exploded view illustrating a filter assembly and the components of my improved packaging for filters.
FIG. 2 is a perspective view showing a filter assembly prior to insertion in the carton and encased in positioning and restraining means for the filter pack, it being understood that the assembly shown in FIG. 2 may, under certrain circumstances, be used as a filter package.

My improved package is particularly applicable to a filter of the type consisting of a relatively rigid frame having a filter pack mounted therein. My invention contemplates providing suitable positioning and restraining means for the filter pack in the form of yielding resilient pads engaging the opposite faces of the filter pack in partially compressed condition and mounted on relatively rigid panels held in fixed position with respect to the frame of the filter so as to resiliently restrain the filter pack against movement wtih respect to the frame.

One form of filter assembly with which my improved package is particularly useful is a high efficiency particulate filter, as for instance the type of filter known as an absolute filter. A filter of this general type is shown in the accompanying drawings and consists generally of a rigid frame 10 having a relatively more flexible filter pack or filter core 12 mounted therein and having sealing engagement therewith. The filter shown is of rectangular shape and, accordingly, the frame 10 is shown as rectangular. It may be made of any suitable material such as wood, metal, ceramic material or the like. The filter pack or core 12 in the illustrated assembly is of the pleated type and it consists of an elongated sheet of filter paper 14 made of glass, asbestos, ceramic or other mineral fibers or blends thereof. The filter sheet is arranged in accordion-pleated zig-zag form as shown most clearly in FIG. 4, with adjacent pleats facing in opposite directions and opening respectively on the opposite faces of the filter. In use, one face of the filter represents the upstream side and the fluid enters into the pleats opening on that face, while the opposite face of the filter represents the downstream side and the fluid leaves through the pleats opening on that face. Suitable separators are positioned in each of the pleats so as to hold the sides of the pleats in spaced relationship to provide entry and exit passages. In this connection, the separators should be self-supporting and of sufficient rigidity to maintain the sides of the pleats in spaced relationship. For this purpose, sheets of material which are corrugated in a direction generally parallel to the direction of flow are employed. The sheets may be made of corrugated aluminum fiberboard or ceramic paper. The filter core thus consists of a sheet of filter material arranged in accordion-pleated form with corrugated separators positioned in each of the pleats.

In order to prevent by-passing of the filter pack or core by the fluid being filtered, the filter pack is suitably sealed around its entire perimeter to the interior of the frame 10. This may be accomplished in any suitable fashion as by means of a yielding gasket (not shown) disposed around the filter pack or by means of a suitable adhesive binding the perimeter of the filter pack to the interior of the frame as shown.

In shipping and handling a filter assembly of this type prior to installation, it is frequently subjected to impacts, jars and shocks which sometimes destroy the seal between the filter pack and the interior of the frame so that the fluid to be filtered can by-pass around the filter pack. In order to protect the filter assembly during shipment and handling, I provide my improved package. My improved package comprises a pair of positioning and restraining means shown generally at 20 and each consisting of a pad 22 made of a yielding resilient material such as foam or sponge rubber of foam or sponge plastic material, particularly polyethylene or polymers or copolymers of polyvinylchloride. The pads 22 are of a size and shape to fit inside the frame 10 at the opposite faces of the filter assembly and they are mounted as by an adhesive on relatively more rigid panels 24 made of fiberboard, plastic or the like.

The panels 24 are of substantially the same size and shape as the perimeter of the frame member 10 and they are applied to the two sides of the frame member at the opposite faces thereof so as to hold the yielding resilient pads in partially compressed relationship in engagement with the faces of the filter pack. The panels 24 are suitably held against movement with respect to the frame member 10 as by binding the assembly with a pressure-sensitive tape in the manner indicated at 26 in FIG. 2. When the panels are thus assembled with the filter, the pads exert yielding resilient force against the opposite faces of the filter pack and thereby serve to restain the filter pack against movement either transversely or longitudinally of the frame.

Under certain conditions, the assembly shown in FIG. 2 may be used during handling and shipping of the filter. However, I prefer to encase this assembly in additional packaging material as shown in FIGS. 1, 3 and 4. Thus, the assembled panels and filter are preferably inserted in a sleeve 28 made of a supporting material such as fiberboard, plastic or the like. The sleeve tightly embraces the assembly, and it is provided with laterally projecting spacer flaps 30 at the upper and lower ends thereof which engage the inner surface of the carton 32, which likewise is made of suitable supporting material such as fiberboard, plastic or the like. The spacers 30 serve to space the sleeve 28 from the walls of the carton 32 and the sleeve thereby provides a shock absorbing support for the filter assembly in the carton. Additional shock absorbing supports in the form of spacer panels 34 are provided at opposite ends of the carton in engagement with the upper and lower surfaces of the frame 10. The panels 34 are likewise formed of suitable supporting material such as fiberboard, plastic or the like, and they are provided with zig-zag folded flanges 36 depending from the lateral edges thereof into engagement with the top and bottom 38 and 40 of the carton 32. It will thus be seen that the sleeve 28 provides shock absorbing support for the sides of the filter, and the panels 34 similarly provide shock absorbing support for the two ends thereof.

In inserting the filter and panel assembly in the carton, the assembly is first placed in sleeve 28, the bottom of the carton is closed and one of the shock absorbing panels inserted therein. The filter assembly encased in the sleeve is then inserted in the carton, the top panel is placed thereon in inverted position and the top 38 of the carton is closed. It will thus be seen that I have provided suitable positioning and restraining means for the filter pack in the form of yielding resilient pads engaging the opposite faces of the filter pack in partially compressed condition and supported on relatively rigid panels held in fixed position with respect to the frame of the filter. This assembly is then supported in a shock absorbing mounting inside of an outer protecting carton. A filter assembly packaged in this fashion can withstand impacts, jars and shocks in shipping and handling without damage to the filter and without causing the filter pack to separate from the frame.

Modifications may be made in the illustrated and described embodiment of my invention without departing from the invention as set forth in the accompanying claims.

I claim:

1. A packaged fluid filter comprising: a filter assembly of the type having a relatively rigid supporting frame extending around the transverse sides of the filter assembly and open on the upstream and downstream faces thereof in a longitudinal direction of flow of the fluid to be filtered and having a relatively fragile filter pack composed in part of a flexible filter material mounted in the frame exposed on the upstream and downstream faces thereof with means providing sealing engagement between the perimeter of the filter pack and the frame; packaging means including a carton encasing said filter assembly, a sleeve of supporting material extending around the filter assembly with spaced spacer portions engaging the inside wall of the carton, and a pair of shock absorbing spacer members positioned at opposite ends of the sleeve in engagement with opposite ends of the filter frame and with the interior of opposite ends of the carton; and positioning and restraining means for said filter pack disposed inside the sleeve in said carton and including a pair of yielding resilient pads each secured to a self-supporting relatively rigid panel of substantially the same size and shape as the periphery of the frame of the filter assembly for holding the pads against movement relative to the frame, said pads being in partially compressed engagement with the opposite faces of the filter pack with at least a portion of said faces being partially imbedded in said pads so that the filter pack is resiliently restrained against movement relative to the supporting frame.

2. A packaged fluid filter as set forth in claim 1 in which the relatively rigid panels are releasably attached to the frame of the filter assembly.

3. A packaged fluid filter comprising: a filter assembly of the type having a relatively rigid supporting frame extending around the transverse sides of the filter assembly and open on the upstream and downstream faces thereof in a longitudinal direction of flow of the fluid to be filtered and having a relatively fragile filter pack composed in part of a flexible filter material mounted in said frame and exposed on the upstream and downstream faces thereof and having means providing sealing engagement between the perimeter of the filter pack and the frame; packaging means including a sleeve-like portion made of supporting material extending rather tightly around the filter assembly; and positioning and restraining means for said filter pack disposed inside said sleeve-like portion and including a pair of self-supporting relatively rigid panels and a pair of yielding resilient pads secured to the confronting faces of said panels, said panels being held in tight engagement with said rigid supporting frame by said sleeve-like portion and being held in relatively fixed position with respect to the frame with said pads being in partially compressed engagement with the opposite faces of the filter pack and with at least a portion of said faces being partially embedded in said pad so as to resiliently restrain the filter pack against movement relative to the supporting frame.

References Cited in the file of this patent

UNITED STATES PATENTS

| | | |
|---|---|---|
| 1,696,341 | Blanchard | Dec. 25, 1928 |
| 2,393,419 | Schaaf | Jan. 22, 1946 |
| 2,486,711 | Harris | Nov. 1, 1949 |
| 2,792,906 | Evans | May 21, 1957 |
| 2,802,544 | Lewis | Aug. 13, 1957 |

FOREIGN PATENTS

| | | |
|---|---|---|
| 701,897 | France | Jan. 13, 1931 |